US010066325B2

(12) United States Patent
Finn et al.

(10) Patent No.: US 10,066,325 B2
(45) Date of Patent: Sep. 4, 2018

(54) FABRIC FOR AN AIR-BAG INCLUDING TAPE-LIKE YARNS

(71) Applicant: Autoliv Development AB, Vårgårda (SE)

(72) Inventors: Hugh Finn, Warrington (GB); David Stow, Gothenburg (SE); Kent Potter, Brigham City, UT (US)

(73) Assignee: AUTOLIV DEVELOPMENT AB, Vargarda (SE)

( * ) Notice: Subject to any disclaimer, the term of this patent is extended or adjusted under 35 U.S.C. 154(b) by 772 days.

(21) Appl. No.: 14/416,426

(22) PCT Filed: Jul. 3, 2013

(86) PCT No.: PCT/SE2013/050853
§ 371 (c)(1),
(2) Date: Jan. 22, 2015

(87) PCT Pub. No.: WO2014/017967
PCT Pub. Date: Jan. 30, 2014

(65) Prior Publication Data
US 2015/0203996 A1    Jul. 23, 2015

(30) Foreign Application Priority Data

Jul. 25, 2012    (EP) ..................... 12177830

(51) Int. Cl.
*D03D 1/02*    (2006.01)
*B60R 21/235*    (2006.01)
(Continued)

(52) U.S. Cl.
CPC ............. *D03D 1/02* (2013.01); *B60R 21/232* (2013.01); *B60R 21/235* (2013.01); *D03D 1/04* (2013.01); *D03D 15/0077* (2013.01); *D03D 15/0083* (2013.01); *D03D 15/0088* (2013.01); *B60R 2021/23514* (2013.01); *D10B 2505/124* (2013.01); *Y10T 442/3033* (2015.04)

(58) Field of Classification Search
CPC ........ B60R 2021/23514; B60R 21/232; B60R 21/235; D03D 15/0077; D03D 15/0083; D03D 15/0088; D03D 1/02; D03D 1/04; D10B 2505/124; Y10T 442/3033
See application file for complete search history.

(56) References Cited

U.S. PATENT DOCUMENTS 4,636,427 A    1/1987    Ohno et al.
6,112,689 A *  9/2000    Baudet .................... B32B 27/12
                                                      114/102.31
(Continued)

FOREIGN PATENT DOCUMENTS

EP    2374923 B1 *  12/2013    ............. B32B 5/024
JP    H11247046 A    9/1999

OTHER PUBLICATIONS

International Search Report and Written Opinio of the ISA for PCT/SE2013/050853, ISA/SE, Stockholm, dated Nov. 7, 2013.

*Primary Examiner* — Arti Singh-Pandey
(74) *Attorney, Agent, or Firm* — Stephen T. Olson; Harness, Dickey & Pierce, P.L.C.

(57) ABSTRACT

A fabric for an air-bag comprising interwoven sets of warp and weft yarns, wherein the yarns of one of the least 1.5, and the yarns of the other set of yarns are not tape-like and have a width-depth ratio less than 1.5.

20 Claims, 1 Drawing Sheet

Figure 1:
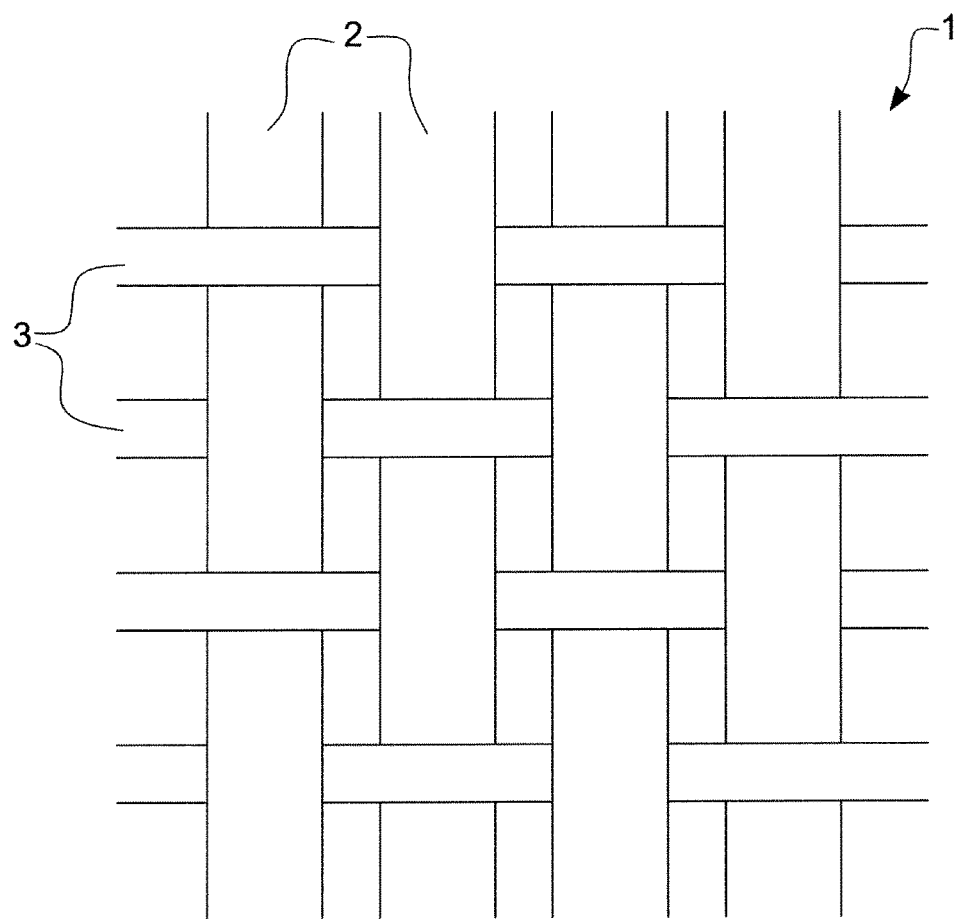

(51) Int. Cl.
*D03D 15/00* (2006.01)
*B60R 21/232* (2011.01)
*D03D 1/04* (2006.01)

(56) References Cited

U.S. PATENT DOCUMENTS

| | | | |
|---|---|---|---|
| 6,632,753 B1 * | 10/2003 | Beasley, Jr. | B60R 21/235 |
| | | | 139/408 |
| 6,632,754 B1 | 10/2003 | Rose, III et al. | |
| 2003/0060104 A1 * | 3/2003 | Veiga | B32B 27/04 |
| | | | 442/76 |
| 2006/0192373 A1 * | 8/2006 | Manley | B29C 70/086 |
| | | | 280/743.1 |
| 2009/0224515 A1 | 9/2009 | Breed et al. | |
| 2011/0042929 A1 * | 2/2011 | Breed | B32B 5/024 |
| | | | 280/743.1 |
| 2013/0026740 A1 * | 1/2013 | Finn | B32B 5/024 |
| | | | 280/728.1 |

* cited by examiner

FABRIC FOR AN AIR-BAG INCLUDING TAPE-LIKE YARNS

CROSS-REFERENCE TO RELATED APPLICATIONS

This application is a 371 U.S. National Stage of International Application No. PCT/SE2013/050853, filed Jul. 3, 2013, which claims priority to European Patent Application No. 12177830.2, filed Jul. 25, 2012. The disclosures of the above applications are incorporated herein by reference.

FIELD

This invention relates to a fabric for use in the manufacture of a vehicle air-bag.

BACKGROUND

Inflatable vehicle air-bags are generally formed from one or more sheets of fabric which are sealed together to form a substantially enclosed internal chamber. When the air-bag is activated, pressurised gas is introduced rapidly into the interior to inflate the air-bag, thus providing a cushioning barrier between an occupant of the vehicle, or a pedestrian, and a stiff, structural part of the vehicle.

Fabrics for use in the manufacture of air-bags are generally formed from warp and weft yarns, which are interwoven substantially at right angles to one another. Conventionally, the warp and weft yarns are monofilament or multifilament yarns, and many different types of yarn may be used for this purpose.

In certain circumstances, for instance in the manufacture of a side-impact air-bag, it is desirable to increase the stiffness of the air-bag in order to increase the resistance of the air-bag to the load imposed by an occupant impacting against the air-bag.

SUMMARY

It is an object of the present invention to provide an improved air-bag fabric.

Accordingly, one aspect of the present invention provides a fabric for an air-bag comprising interwoven sets of warp and weft yarns, wherein the yarns of one of the sets of yarns are tape-like, having a width/depth ratio of at least 1.5, and the yarns of the other set of yarns are not tape-like and have a width-depth ratio less than 1.5.

Advantageously, the stiffness of the fabric in a direction parallel with the first set of yarns is at least 15N greater than the stiffness of the fabric in a direction parallel with the second set of yarns.

Preferably, the first set of yarns comprises monofilament tape elements.

Conveniently, the first set of yarns is formed from a polymer material having an additional material mixed into a base polymer.

Advantageously, the additional material has a specific heat capacity which is significantly higher than that of the base polymer.

Preferably, the further material comprises metal particles or a phase change material.

Conveniently, the further material is an adhesive.

Advantageously, the first set of yarns is formed from multiple layers of material, with one of the layers comprising a layer of a base polymer.

Preferably, a further layer of material is formed from a material with a significantly higher specific heat capacity that than that of the base polymer.

Conveniently, a further layer comprises an adhesive.

Advantageously, the first set of yarns comprise embossed regions, corrugation and/or wrinkles.

Preferably, at least one layer of the first set of yarns has perforations formed therethrough.

Another aspect of the present invention provides an air-bag formed from fabric according to any preceding claim.

Conveniently, the air-bag is an inflatable curtain-type air-bag.

Advantageously, the air-bag initially provided in a rolled configuration, and the air-bag is rolled around an axis which is generally parallel with the first set of yarns.

BEST DESCRIPTION OF THE DRAWINGS

Figure 2A:
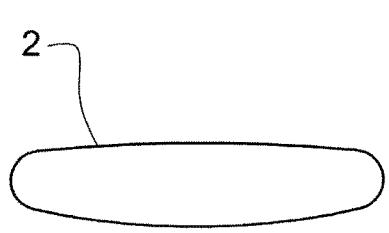
Figure 2B:
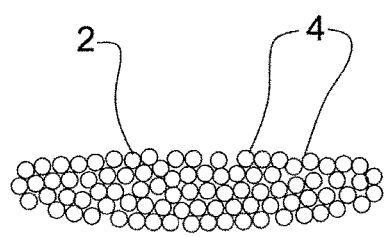

In order that the present invention may be more readily understood embodiments thereof will now be described, by way of example, with reference to the accompanying drawings, in which:

FIG. 1 is a schematic view of a region of a fabric embodying the present invention; and FIGS. 2a and 2b show cross-sectional views through different types of yarn that may be used with the present invention.

DETAILED DESCRIPTION

Referring firstly to FIG. 1, a close-up view of a region of a fabric 1 embodying the present invention is shown. As discussed above, the fabric 1 has warp fibre 2 and weft fibres 3 which are interwoven with one another. The fibres 2 and 3 are interwoven such that, as each warp fibre 2 is followed along its length, it passes alternately under and over successive weft fibres 3 that are encountered. Similarly, as each weft fibre 3 is followed along its length, it passes alternatively under and over successive warp fibres 2 that are encountered.

The invention is not limited to this configuration, and other weave patterns are also possible.

One of the sets of fibres (in the depicted embodiment, the warp fibres 2) comprises monofilament tapes. A monofilament tape is an elongate element having a width which is greater than its depth. In this specification an element is considered to be a tape if the ratio between its width and depth is at least 1.5.

The warp yarns 2 are described as "monofilament" tapes in that they are each formed from a single, unitary element and not from a collection or bundle of smaller elements.

One effective way to form monofilament tapes is to form a region of a film, for instance a film of nylon or polyester, and to cut the film into strips. For instance, this may be achieved by extruding a relatively wide film (e.g. of an olefin polymer), slitting the film into individual tapes and hot-stretching the tapes to induce high longitudinal strength. Those skilled in the art will realise that other techniques are possible, however. Each strip comprises one monofilament tape which has a depth equal to the depth of the film and a width equal to the width of the strip.

Alternatively, lengths of tape may be formed through an extrusion process, through a die having an elongate aperture. Those skilled in the art will be aware of these and also further ways in which suitable tapes may be created.

The weft yarns 3 do not comprise tapes, and have width/depth ratios below around 1.5. The weft yarns 3 may be formed from conventional yarns, and may have substantially circular cross-sections (although there will generally be some distortion of the cross-sections caused by the weaving process). One benefit of using conventional yarns for the weft yarns 3 is that it is more straightforward to weave the fabric using a standard loom, which will be configured for use with these yarns.

It will be understood that the stiffness of a monofilament tape, in its longitudinal direction, will be significantly greater than the stiffness of a corresponding multifilament yarn. The fabric 1 shown in FIG. 1 will therefore have a high stiffness in a direction substantially parallel with the warp fibres 2 (i.e. the vertical direction as shown in FIG. 1), and a lower stiffness in a direction that is generally parallel with the weft fibres 3 (i.e. the horizontal direction, as shown in FIG. 1).

One application in which a fabric of this type would be of use is in side-impact, inflatable curtain-type air-bags. These air-bags are often provided in rolled form along the roofline of a vehicle, and upon impact unroll downwards as they are inflated to form a curtain between the occupant and the internal side-wall of the vehicle.

These air-bags are, however, by necessity relatively thin, because in a normal driving position the occupant is generally already fairly close to the internal side wall of the vehicle. An inflatable curtain-type air-bag will therefore generally have a depth much less than that of a driver or passenger frontal air-bag.

A fabric such as that discussed above can be used to form an inflatable curtain air-bag, with the yarns formed from tapes being arranged longitudinally so that, when the air-bag is deployed, the tapes lie in a direction which is approximately parallel with the normal forward direction of travel of the vehicle. This means that, when deployed, the air-bag will have an increased stiffness in the lateral direction, and this will transfer the force of the occupant's impact against the air-bag more effectively to the main support points of the vehicle's side wall, in particular (in most examples) the A, B and C pillars.

Importantly, the fact that the fibres that are arranged perpendicular to the tapes are regular fibres allows the air-bag to be rolled relatively easily, and also to unroll readily during deployment.

It will therefore be understood that a fabric such as that disclosed above can be used to form an inflatable curtain air-bag that can be easily rolled prior to deployment, which will not present excessive resistance to unrolling during deployment, but which presents increased stiffness to the load of an occupant impacting against the air-bag, and transmits this load effectively to the structure of the vehicle.

Preferably, the stiffness of the fabric in a direction parallel with the tapes is in excess of 30N, as measured according to standard test method number ASTM 4032 (known as the "King Stiffness Method"), and the stiffness of the fabric in a direction parallel with the regular fibres is less than 15N, again as measured by ASTM 4032.

FIG. 2a shows a schematic cross-sectional view of one of the warp fibres 2. It can be seen that the tape comprises a unitary element, without any significant features in its internal structure.

In alternative embodiments of the invention, the warp fibres 2 may be formed from multifilament tapes, comprising ribbon-like elements which have widths significantly greater than their depths, but which are formed from a shaped bundle of individual filaments 4, which are generally not themselves tape-shaped, and may have generally circular cross-sections. FIG. 2b shows a cross-section of a multifilament tape of this type. The use of multifilament tapes, instead of monofilament tapes, can help to reduce the weight and packing volume of the fabric, and also the ease with which it can be rolled for packaging as part of an air-bag module, prior to deployment—as the yarns are made of individual filaments they can more easily move relative to one another. The use of multifilament yarns to form the tapes will confer at least some of the benefits of monofilament yarns with regard to increased stiffness of the fabric in the direction substantially parallel with the tapes.

In preferred embodiments of the invention, the fabric includes yarns comprising monofilament tapes which have a base material comprising a polymer (for instance, nylon or polyester), but at least one further material is also included in the formation of the tape. For instance, the further material may be formed as a parallel layer with the polymer. Alternatively, or in addition, the further material may be mixed with the polymer before the film forming the tape is produced or mixed into the polymer prior to its extrusion into a tape yarn is formed.

One example of a further material is metal particles, which have the function of absorbing heat, helping to prevent heat conduction through the fabric. It will be understood that this is likely to be advantageous in deployment situations where high temperatures may be involved, both as a result of an impact itself and as a result of pressurised gas being introduced into the interior of the air-bag by means of a pyrotechnic device. It is relatively common for vehicle occupants to suffer burns through impact with an air-bag, and the introduction of a further material comprising metal particles, and/or another heat absorbing material, will help to reduce the risk of this occurring.

In further embodiments of the invention, a phase change material may be introduced to absorb heat. It will be understood that a phase change material has a high heat of fusion, and is capable of absorbing large amounts of energy when changing phase, for instance from the solid to the liquid phase.

One potential problem with fabrics including tape yarns is that the tapes are unstable. For instance, the tape yarns may twist during manufacture, processing or deployment, or in other situations where large forces are placed on the fabric, and this can affect the performance of the fabric considerably. This is not generally the case with conventional yarns which have substantially circular cross-sections—if these yarns twist (unless they twist by a very large amount) there is little or no impact on the performance or characteristics of the fabric.

One way to stabilise the fabric is to form the tape yarns so that one or both sides of the tape comprises an adhesive substance. This could be achieved by mixing an adhesive with a polymer from which the yarn is formed, or by adding a layer of adhesive to one or both surfaces of the tape after it has been formed. Adhesive may be applied to the tape by applying a coat of adhesive directly on to the tape (for instance, by spraying), or alternatively a separate film of adhesive may be attached to the film of polymer from which the tapes are formed, so that the tape is a multi-layer tape. During weaving of the fabric, the tape yarns can then be adhered to the other yarns in the fabric, thus helping to stabilise the fabric.

In preferred embodiments, the adhesive is activatable, and has relatively low adhesive properties prior to activation. This means that the tape elements are relatively easy to handle and work with when forming the fabric. Once the warp and weft yarns have been interwoven with one another, the adhesive can be activated to bind the yarns together, thus stabilising the fabric. The adhesive may be activated by heat and/or pressure, for example, and a skilled person will be aware of various ways in which suitable adhesives can be activated. If the adhesive is activated by heat or pressure, then the fabric can be stabilised by passing the fabric between a pair of closely-spaced rollers, to apply pressure to the fabric, or by passing the fabric between heated rollers, or through a suitable oven, to expose the fabric to heat.

When a fabric is formed using the techniques discussed above it is possible for the tape yarns to be excessively stiff. This may mean that an air-bag formed from the fabric may be too stiff to cushion a vehicle occupant's impact to the desired extent.

One way to reduce the stiffness of the tape yarns is to form the tape yarns with perforations therethrough. These perforations may be formed, for example, by forming the film on a surface which includes protrusions, or by forming the perforations after manufacture, for instance, by passing the tapes (or a film from which the tapes are to be formed) between rollers which have many small, sharp protrusions.

Ideally, the perforations are made to be too small to allow any significant quantities of gas to escape through the perforations during deployment of the air-bag. For instance, the perforations are ideally around 0.1 mm or less in size, and may have a maximum size of 0.3 mm. Alternatively, or in addition, the fabric may be formed with a coating which will cover the perforations and prevent excessive gas escape.

In other preferred embodiments, the tape yarns may be formed from multiple layers of film, each of which is formed with perforations. The layers of film have perforations formed in them independently, and are subsequently attached to one another, so that the perforations will (in general) not align with one another and therefore the perforations will provide no (or very few) gas paths through the fabric.

Alternatively, the tape elements (or a film from which the tape elements will be cut) may be formed to be multi-layer, with at least one layer not having perforations formed therethrough. This will prevent gas from escaping through the tape elements.

One potential disadvantage of the tape elements formed from films is that tape elements are likely to have relatively smooth surfaces. This can reduce the stability of the fabric as, if high forces are applied to the fabric, the warp and weft yarns may slide with respect to one another. This can cause relatively large gaps in the fabric to open, thus allowing gas to pass through the fabric.

To reduce the possibility of this happening one or both major surfaces of the tape elements may be roughened, to reduce the likelihood of the tape element slipping with respect to the other fibres in the fabric. For instance, one or both major surfaces may be stamped or embossed, in order to roughen the surfaces. Alternatively, the surfaces may be wrinkled. As a further alternative, the tape elements may be fibrillated, and this is achieved by over-stretching the extruded film or tape, causing the material to split into fibrils. A skilled person will understand how these surfaces may be roughened.

A further benefit is that, if the surfaces of a tape yarn are roughened through the introduction of corrugations and/or wrinkles, the length of the yarn will tend to shorten somewhat. This means that, when the yarn is placed under tension, the yarn is able to elongate, as the embossed regions, corrugations and/or wrinkles straighten out. This can increase the ability of the fabric to absorb energy when impacted by a vehicle occupant.

It is also envisaged that the tape yarns may be formed from multiple layers. If one layer is embossed or has wrinkles formed therein, and one other layer does not, the embossed region/wrinkles may be held in place by the other layer, and this will improve the stability of the fabric.

It will be understood that fabrics embodying the present invention may have advantageous properties, which will find utility in many areas, particularly in the manufacture of vehicle air-bags.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A fabric for an air-bag comprising warp yarns and an interwoven plurality of weft yarns, wherein the yarns of one of the plurality of warp and weft yarns are tape-like, having a width/depth ratio of at least 1.5, and the yarns of the other yarns are not tape-like and have a width-depth ratio less than 1.5.

2. An air-bag comprising:
a fabric including a plurality of warp yarns and a plurality of weft yarns interwoven with the plurality of warp yarns, the yarns of one of the pluralities of warp and weft yarns being tape-like with a width/depth ratio of at least 1.5, and the yarns of the other of the pluralities of warp and weft yarns are non tape-like and have a width-depth ratio less than 1.5.

3. The fabric according to claim 2, wherein the tape-like yarns are monofilament tape elements.

4. The fabric according to claim 2, wherein the tape-like yarns are formed from a polymer material having an additional material mixed into a base polymer.

5. The fabric according to claim 4, wherein the additional material has a specific heat capacity which is significantly higher than that of the base polymer.

6. The fabric according to claim 5, wherein the further material comprises metal particles or a phase change material.

7. The fabric according to claim 4, wherein the further material is an adhesive.

8. The fabric according to claim 4, wherein the tape-like yarns are formed from multiple layers of material, with one of the layers comprising a layer of a base polymer.

9. The fabric according claim 2, wherein the tape-like yarns are formed from multiple layers of material, with one of the layers comprising a layer of a base polymer.

10. The fabric according to claim 9, wherein a further layer of material is formed from a material with a significantly higher specific heat capacity than that of the base polymer.

11. The fabric according to claim 9, wherein a further layer comprises an adhesive.

12. The fabric according to claim 2, wherein the tape-like yarns include embossed regions, corrugation and/or wrinkles.

13. The fabric according to claim 2, wherein at least one layer of the tape-like yarns has perforations formed therethrough.

14. The air-bag of claim 2, wherein the tape-like yarns have a first stiffness and the non tape-like yarns have a second stiffness, the first stiffness being greater than the second stiffness.

15. The air-bag according to claim 14, wherein a first stiffness is at least 15N greater than the second stiffness.

16. The air-bag according to claim 14, wherein the air-bag is an inflatable curtain-type air-bag.

17. The combination of claim 16 in further combination with an air-bag module, wherein the air-bag is stored in a rolled configuration, and the air-bag is rolled around an axis which is generally parallel with the tape-like yarns.

18. The air-bag according to claim 16, wherein the tape-like yarns having the first stiffness extend longitudinally along a length of the inflatable curtain-type air-bag and the non tape-like yarns having a second stiffness are perpendicular thereto.

19. A vehicle including an inflatable curtain-type air-bag, the air-bag comprising:
a fabric including a plurality of warp yarns and a plurality of weft yarns interwoven with the plurality of warp yarns, the yarns of one of the pluralities of warp and weft yarns being tape-like with a width/depth ratio of at least 1.5, and the yarns of the other of the pluralities of warp and weft yarns are non tape-like and have a width-depth ratio less than 1.5.

20. The vehicle of claim 19, wherein the tape-like yarns have a first stiffness and the non tape-like yarns have a second stiffness, the first stiffness being greater than the second stiffness, the tape-like yarns having the first stiffness extend longitudinally along a length of the inflatable curtain-type air-bag and the non tape-like yarns having a second stiffness are perpendicular thereto.

\* \* \* \* \*